United States Patent [19]

Koeniger

[11] Patent Number: 4,971,432
[45] Date of Patent: Nov. 20, 1990

[54] BIFOCAL CONTACT LENS

[76] Inventor: Erich A. Koeniger, 5600 Bridget St., Metairie, La. 70003

[21] Appl. No.: 447,075

[22] Filed: Dec. 7, 1989

[51] Int. Cl.$^5$ ............................................. G02C 7/04
[52] U.S. Cl. ...................................... 351/161; 351/177
[58] Field of Search ............... 351/160 R, 160 H, 161, 351/162, 177

[56] References Cited

U.S. PATENT DOCUMENTS

Re. 25,286  11/1962  De Carle .......................... 351/161
4,418,991  12/1983  Breger ............................. 351/161

Primary Examiner—Scott J. Sugarman
Attorney, Agent, or Firm—Staas & Halsey

[57] ABSTRACT

A bifocal contact lens includes a near vision portion having a first radius curvature and a far vision portion concentric with the near vision portion and having a second radius of curvature. A junction is formed where the near vision and far vision portions meet. This junction is polished to remove the sharp demarkation between far and near vision portions so that an annulus of multiple radii is formed where the two vision portions meet. This annulus prevents double vision associated with sharp junctions between far and near portions.

7 Claims, 1 Drawing Sheet

BIFOCAL CONTACT LENS

BACKGROUND OF THE INVENTION

1. Field of the Invention

The present invention relates generally to the field of optics and, in particular, to a bifocal corneal contact lens.

2. Description of the Related Art

Although refracting contact lenses have been in existence for nearly 100 years, they have generally been unsuccessful when adapted for use as a bifocal lens. Bifocal contact lenses have been commercially available for the past 30 years but, for various reasons have not proven to be successful. Generally, these lenses tend to have either good distance vision with poor reading vision, or good reading vision with poor distance vision. Part of the reason for this is the delineation between near and far vision portions of the lens created by polishing.

One type of best known bifocal contact lens is referred to as the crescent seg fused bifocal. A segment of higher index plastic is fused into a lower index plastic matrix to create a reading section. This reading section is held in correct position on the eye by the use of prism for ballast. However, edema has been induced by such lenses because of their use of PMMA plastic. Thus, the wearing time is diminished, and the lenses are also uncomfortable due to the creation of a prism and the weight of the lens.

Other attempts to create a viable bifocal contact lens have led to the use of a lens which has concentric far and near portions. Referring to FIGS. 1 and 2, a contact lens 10 has two concentric portions, a far distance portion 12 which is circular in shape, and a near distance portion 14 which is annularly shaped around the central circular portion.

In the manufacturing process, the far and near vision portions are cut and polished to achieve the required refraction. The polishing occurs on the anterior surface 16 of the lens 10 while rotating same and applying a polishing tool and polishing fluid to the anterior surface 16.

The polishing process leaves the anterior surface with different radii of curvature for the different vision zones. As seen in FIG. 1, the far distance portion 12 has a flatter curvature than the near distance portion 14. The difference in curvature results in the formation of a sharp, annular junction 20 where the curvature radius changes between the two vision portions. This junction creates two problems. First, it creates a line between the near and far vision portions which, when the lens moves on the eye, creates an image jump or double vision. Secondly, the junction 20 creates a source of irritation for the user because of the non-curvilinearity of the anterior surface 16.

SUMMARY OF THE INVENTION

An object of the present invention is to provide a bifocal contact lens in which there is no line or sharp junction between far and near portions which creates image jump or double vision.

Another object of the present invention is to provide a bifocal contact lens which has a more curvilinear anterior surface, thus rendering the lens more comfortable to wear.

Another object of the present invention is to provide a method of manufacturing a bifocal contact lens using simple polishing techniques.

To attain the above and other objects of the invention, a bifocal contact lens is provided which includes a near vision portion having a first radius of curvature, a far vision portion concentric with the near vision portion and having a second radius of curvature, a junction being formed where the near vision and far vision portions meet, and an aspheric curved annulus formed at the junction of the near vision and far vision portions to smoothly converge the first and second radii of curvature.

In another aspect of the present invention, a method of making a bifocal contact lens includes forming a near vision portion having a first radius of curvature, forming a far vision portion concentric with the near vision portion and having a second radius of curvature, a junction being formed where the near vision and far vision portions meet, and forming a aspheric curved annulus at the junction of the near vision and far vision portions to smoothly converge the first and second radii of curvature.

These and other features and advantages of the bifocal contact lens according to the present invention will become more apparent with reference to the following detailed description and drawings.

DETAILED DESCRIPTION OF THE PREFERRED EMBODIMENTS

Figure 1:
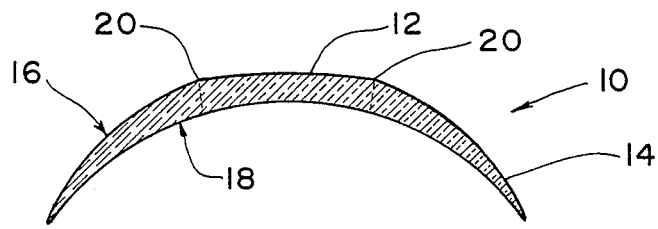
FIG. 1 is a vertical sectional view of a known concentric bifocal lens.
Figure 2:
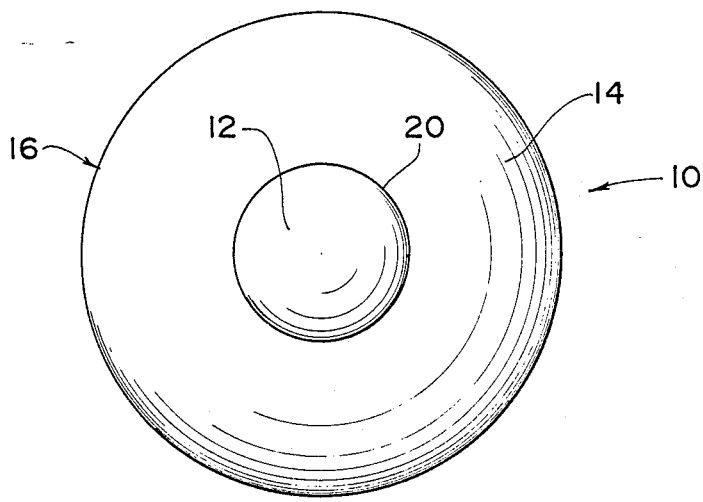
FIG. 2 is a plan view of the contact lens of FIG. 1.

As described above, the concentric bifocal contact lens 10 illustrated in FIGS. 1 and 2 has a relatively sharp junction 20 formed where the near vision portion meets the far vision portion 12. The junction results substantially from the change in radius of curvature from the relatively flat radius for the far vision portion 12 to the more curved radius for the near vision portion 14. The different radii of curvature results from the lathing and polishing steps which are used to obtain the desired amount of refraction for each portion of the lens.

Figure 3:
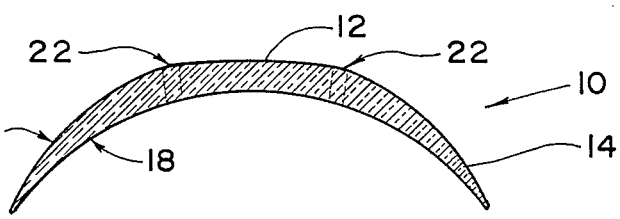
FIG. 3 is a vertical sectional view of a bifocal contact lens according to the present invention.
Figure 4:
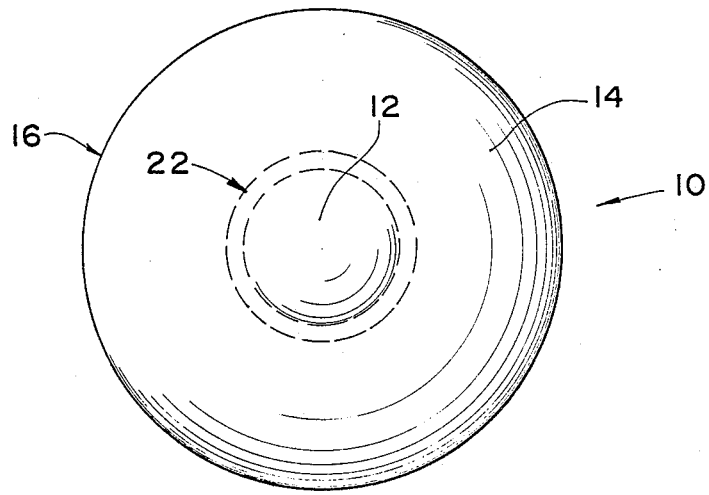
FIG. 4 is a plan view of the contact lens of FIG. 3.

According to the present invention, as illustrated in FIGS. 3 and 4, the bifocal contact lens 10 has a near vision portion 14 which has a first radius of curvature, and a far vision portion 12 concentric with the near vision 14 and having a second radius of curvature. Although there is a "junction" between the two vision portions, according to the present invention the junction is an aspheric curved annulus 22 made by an aspheric cut approximately centered over the original sharp junction 20. This cut is made by polishing at the junction of the near vision and far vision portions to smoothly converge the first and second radii of curvature. The central, circular portion of the lens, which is between 3.5 and 5 millimeters in diameter, is the distance portion 12, and the rest of the lens is the reading or near vision portion 14.

By cutting an aspheric surface between the distance and reading portions of the lens, approximately 1 millimeter wide, there is no demarkation visible between the two sections and therefor the eye will not pick up the jump between distance and reading sections of the lens. As illustrated in FIG. 4, the aspheric surface is a curved annulus 22 approximately centered where the junction used to be. By polishing this area, the sharp junction is removed and, in effect, the new junction is an annular zone 22 having numerous radii.

The lens according to the present invention can be fitted like any standard lens and manufactured in any type of material, soft or rigid. The ideal fit of the lens is an aspheric back curve parallel to the cornea. The lens diameter may vary according to individual requirements.

In the method according to the present invention, the near vision and far vision portions are formed by polishing according to known techniques. In forming the aspheric curved annulus 22, which has the affect of removing the sharp junction 20, a polishing tool is applied to the zone illustrated in FIG. 4 by the numeral 22. The polishing tool may use a polishing cloth and a heavy liquid polish. In effect, polishing this zone blends the distance portion and near portions so that no line will be visible. The polishing cloth may be pitch or cotton, or other suitable material. The polishing fluid may be any of the known and commercially available polishing fluids.

As described herein, the phrase "sharp junction" is a relative term and refers to a substantial circular line formed by the abrupt change of radius of curvature from one vision zone to the next. The invention is directed to a method of making a lens in which the junction is removed by polishing only in a small area centered on the junction. The invention also is directed to a lens having the junction removed, so that an aspheric cut replaces the sharp junction. The cut is an annular surface of multiple radius, or interpolated radii between the radius of the near vision portion and the radius of the far vision portion.

Numerous modifications and adaptations of the present invention will be apparent to those so skilled in the art, and thus, it is intended by the following claims to cover all such modifications and adaptations which fall within the true spirit and scope of the invention.

What is claimed:

1. A bifocal contact lens having an anterior surface and a posterior surface, comprising:
   a near vision portion for which the anterior surface has a first radius of curvature;
   a far vision portion for which the anterior surface has a second radius of curvature;
   a junction being formed on the anterior surface where the near vision and far vision portions meet; and
   an aspheric curved annulus formed on the anterior surface at the junction of the near vision and far vision portions to smoothly converge the first and second radii of curvature of the anterior surface.

2. A bifocal contact lens according to claim 1, wherein the far vision portion is concentric with the near vision portion.

3. A bifocal contact lens according to claim 2, wherein the far vision portion is a central circular portion and the near vision portion is an annulus formed around the far vision portion.

4. A bifocal contact lens according to claim 1, wherein the aspheric curved annulus has multiple radii.

5. A method of making a bifocal contact lens having an anterior surface and a posterior surface comprising the steps of:
   forming a near vision portion for which the anterior surface has a first radius of curvature;
   forming a far vision portion for which the anterior surface has a second radius of curvature, a junction being formed on the anterior surface where the near vision and far vision portions meet; and
   forming an aspheric curved annulus on the anterior surface at the junction of the near vision and far vision portions to smoothly converge the first and second radii of curvature of the anterior surface.

6. A method according to claim 5, wherein the various forming steps are performed by polishing.

7. A method according to claim 5, wherein the various forming steps comprise cutting the anterior surface of the lens to effect a desired refraction for near vision, cutting another area of the anterior surface of the lens to effect a desired refraction for far vision, and removing a sharp junction formed between the far and near vision portions by cutting the junction.

* * * * *